June 7, 1938.  R. B. CALCUTT  2,120,017
WEATHER STRIP
Filed Jan. 13, 1936
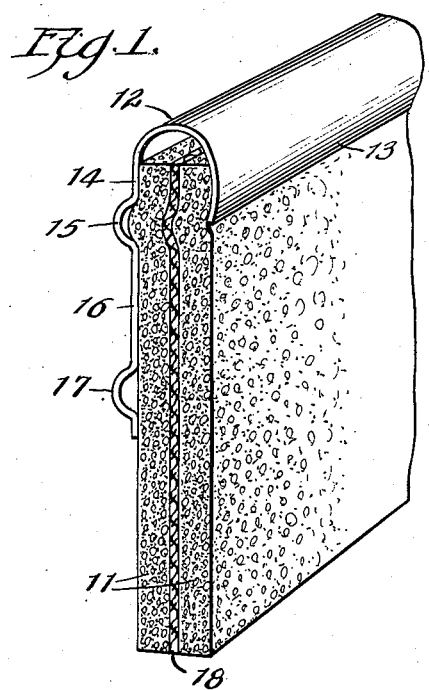
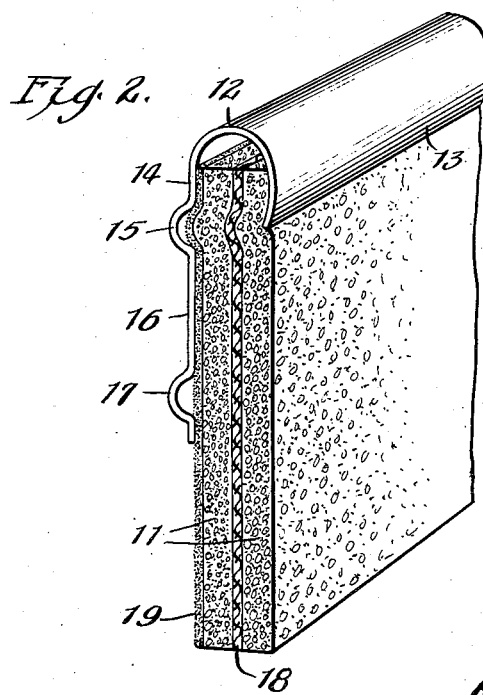
Inventor:
Reginald B. Calcutt
By E. R. Lundy Atty.

Patented June 7, 1938

2,120,017

UNITED STATES PATENT OFFICE 2,120,017

WEATHER STRIP

Reginald B. Calcutt, Chicago, Ill.

Application January 13, 1936, Serial No. 58,798

4 Claims. (Cl. 20—69)

My present invention relates to weatherstrips, gaskets, and other sealing devices of strip form. The structure which is herein disclosed is especially designed for use on windows, doors, ventilators, and various members, and in fact it is well adapted to be used at any place where it is desired to seal a crevice or space between the meeting surfaces of fixed or of relatively movable members.

In the present instance I have designed a weatherstrip or gasket wherein the cushion or yieldable element is formed from what is commercially known as sponge rubber or a similar material that readily compresses or yields to extraneous pressure and is inherently capable of returning to its normal shape or position when pressure is released. The cushion element may be superposed plies of sponge rubber with an interposed ply of reinforcing or stiffening material. The outer surfaces of the cushion element may be plain; also one of its surfaces may have suitable material, fibrous or fabric, adhered to it. Furthermore, it is desirable to mount the cushion element in or upon a molding strip of either wood or metal, and in the use of a metal strip the latter is shaped and fabricated in a manner that securely retains the cushion strip against dislodgement therefrom.

When used with a wooden molding strip it is preferred to "felt" the surface of the cushion that is next the wood thus providing a binder to insure adhesion of the rubber or similar cushion material to the wood.

Among the numerous objects of my invention which may be mentioned are to provide a weatherstrip or the like that is novel in construction; dependable in performing its functions; that is easy to attach; cheap to manufacture, so that it may be sold at a reasonable retail price; and is sturdy in the construction and arrangement of its parts. Further objects and advantages will be obvious to persons skilled in the art after my invention is understood from the following description.

I prefer to accomplish the numerous objects of my invention and to practice the same in substantially the manner fully described herein, and as more particularly pointed out in the claims, reference being made herein to the accompanying drawing that forms a part of this specification.

In the drawing all of the figures represent end views in perspective of different forms in which my invention may be made.

Figure 1 shows a cushion of superposed plies of sponge rubber with an interposed reinforcing ply and clamped in a metal molding strip.

Figure 2 shows a cushion similar to Figure 1 with a facing ply upon an outer surface.

I have ascertained that sponge rubber in relatively narrow strips provides a dependable cushion for a weatherstrip in that such material is soft and yieldable and it possesses the inherent quality of yielding to extraneous pressure and it readily returns to its normal shape and position when such pressure is released. A simple form of a weatherstrip cushion is shown in Figure 1 which consists of a relatively narrow strip 11, of substantially rectangular cross-section, that may be held in a molding strip of either metal or wood which permits the cushion to be readily attached or mounted. The molding strip is so shaped in cross-section that it will securely hold an edge of the cushion element. The molding strip shown is formed of metal with a channel or seat 12 of substantially U-shape in cross-section, and the spaced arms of this U-shaped strip are of different dimensions. The smaller arm 13 curves inwardly toward the other arm 14 which, as shown, is the widest of the two arms. At a location about opposite the lower edge of arm 13 the wider arm 14 is provided with an outwardly extending bead or rib 15, and beyond this bead said arm 14 extends downwardly providing a flat portion 16 which, near its free edge, is formed with a second rib or bead 17.

The free or lower edge of the arm 13 is opposite the recess that is formed on the inside of the bead 15 and, when the edge of the cushion is inserted between these parts and the arms are pressed towards each other in the manner shown, the cushion strip will be firmly held in position due to the fact that a longitudinal portion of the cushion is slightly compressed and bulges into the recess back of the rib or bead 15. This molding strip or casing is made preferably from metal of a suitable gauge to maintain the parts in the assembly above described and may, if desired, be provided with a plurality of indentations or perforations (not shown) extending longitudinally in the flat portion 16 to permit the nail, tack or brad to be inserted to mount the weatherstrip in the usual manner. The beads or ribs, besides performing the function just described also tend to stiffen the molding or casing.

Figure 1 discloses a cushion formed with superposed plies 11 of sponge rubber or like material with an interposed ply 18 of reinforcing or stiffening material which is preferably inserted between the plies during the manufacture of the sponge rubber plies so that it is adhered to the adjacent surfaces thereof. This reinforcement or stiffening ply may be burlap or other woven fabric or it may be a thin sheet of rubberized cloth or a sheet of rubber or the like, or any other suitable material.

Figure 2 shows a multiple-ply cushion similar to that shown in Figure 1 and one surface of the cushion has been "felted". This felt ply 19 may be a thin sheet or strip of any kind of felt, adhered to the surface of the sponge rubber in any suitable manner, or it may be a fibrous coating that may be applied by depositing the fibers upon a suitable adhesive coating on the surface of the sponge rubber. In either type the surface is what I have termed as "felted".

In Figure 2 of the drawing I have shown what has been termed herein a "felted" face which consists either of a felt ply adhered to the sponge rubber or the felt fibers are applied as a coating by the medium of a cement. I do not, however, limit myself to a felt face or "felted" coating in view of the fact that a suitable fabric or cloth may be substituted for the felt without affecting the construction and operation of the weatherstrip. Such substitution is fully contemplated as included within the scope of the appended claims.

What I claim is:—

1. A weatherstrip comprising a cushion embodying elongated relatively narrow superposed plies of sponge rubber, a reinforcing ply interposed between said sponge rubber plies and adhered thereto, and a molding strip having a seat in which a longitudinal marginal portion of the cushion is secured.

2. A weatherstrip embodying a cushion formed of elongated relatively narrow superposed plies of sponge rubber providing the body thereof, a ply of another and different material interposed between said sponge rubber plies and substantially co-extensive therewith and adhered thereto, and a molding strip having a seat in which a longitudinal marginal portion of the cushion is secured.

3. A weatherstrip embodying a cushion formed of elongated relatively narrow superposed plies of sponge rubber, a reinforcing ply interposed between said sponge rubber plies and adhered thereto, a facing of suitable material adhered to an outer surface of the cushion, and a molding strip having a seat in which a longitudinal marginal portion of the cushion is secured.

4. A weatherstrip embodying a cushion comprising elongated relatively narrow superposed plies of sponge rubber, a reinforcing ply interposed between said sponge rubber plies and adhered thereto, a facing of suitable material adhered to a surface of the sponge rubber, and marginally disposed means secured to the cushion for mounting the weatherstrip.

REGINALD B. CALCUTT.